Oct. 30, 1945.  A. H. WILLIAMS  2,387,962
ANTIFRICTION BEARING
Filed Sept. 28, 1942

Patented Oct. 30, 1945

2,387,962

UNITED STATES PATENT OFFICE 2,387,962

ANTIFRICTION BEARING

Arthur H. Williams, Riverside, Ill., assignor to Shafer Bearing Corporation, Chicago, Ill., a corporation of Illinois Application September 28, 1942, Serial No. 459,891

5 Claims. (Cl. 308—214)

This invention relates to antifriction bearings and has particular relation to a bearing construction embodying a guide ring for guiding certain of the bearing elements.

One of the objects of the invention is to provide a guide ring for supporting the retaining member or members of an antifriction bearing to maintain the same in substantially coaxial relation to the race members regardless of wear in the roller openings of the retaining members, which wear might otherwise cause said members to drop out of position after the bearing has been in service for a period of time, particularly under severe wearing conditions. A bearing may be quickly destroyed when the retaining members thus drop out of place, and therefore the provision of means for avoiding this condition constitutes a valuable improvement.

Another object of the invention is to provide an antifriction bearing having a guide ring of the above-indicated character, which also serves to prevent axial displacement of the bearing rollers by centrifugal force while the bearing is in operation.

A further object is to provide an antifriction bearing embodying a guide ring of the above-indicated character which is so related and disposed with respect to the bearing rollers as to exert a squaring action thereon, thus preventing their skewing or getting out of proper rolling position.

A still further object of the invention is to provide a self-aligning antifriction bearing embodying the various features referred to above.

The invention will be better understood and other objects and advantages thereof will appear from a consideration of the detailed description set forth hereinafter, in conjunction with the accompanying drawing, in which.

Figure 1:
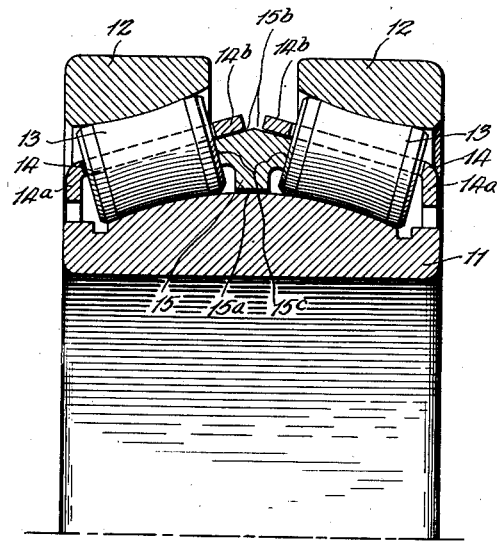
Fig. 1 is a half-sectional view of an antifriction bearing embodying the invention, taken through the longitudinal axis of such bearing.

Referring first to Fig. 1, the bearing illustrated therein comprises an inner race member 11, a pair of outer race members 12, 12, and two rows of oppositely inclined bearing rollers 13, 13 coacting between the inner race member 11 and the respective outer race members 12, 12. This bearing is of the well-known self-aligning type in which the bearing surface of the inner race member 11 is of substantially spherical curvature and the bearing surfaces of the outer race members 12, 12, are of convex curvature complementary to that of the inner race member. The rollers 13 are of the concave type having their bearing surfaces of suitable longitudinal concavity to coact properly with the convex bearing surfaces of the race members 11 and 12. The ends of the rollers are ground flat.

With this construction a substantial amount of misalignment between the inner and outer race members, occasioned by misalignment between the shaft upon which the inner race member is mounted and the housing or other structure in which the outer race members are mounted, is readily accommodated. It will be understood, of course, that the outer race members will be supported and secured in proper positions relative to each other by any suitable housing or other structural means such as is well known in the art.

In order to maintain the rollers 13 of each row in proper running positions, retaining members 14, 14 are provided for said rows of rollers, respectively. It will be understood that the width of the individual roller openings in such retainers is slightly less than the diameter of the rollers at one or more corresponding positions along the length thereof, so that the retainers normally float on the rollers and are held in their proper positions thereby. As shown in the drawing, the roller-engaging portions of the retainers are inclined similarly to the rollers and are located slightly outside the axes thereof with respect to the axis of rotation of the entire bearing. An inwardly turned strengthening flange portion 14a is formed at the smaller end of each retainer and a projecting portion 14b is provided at the larger end thereof.

Under certain conditions of operation bearing retainers are subjected to excessive wear, and when such wear progresses, in bearings of conventional construction, to a point where the width of the roller openings in the retainers is equal to the corresponding roller diameter, the retainers drop down over the rollers to positions far out of axial alignment with the race members of the bearing. In such positions the retainers can no longer serve their intended purpose and in fact may cause rapid destruction of the bearing due to jamming of the parts.

The present invention eliminates this difficulty by providing a guide ring such as that indicated by the reference character 15 in Fig. 1, upon which the retainers are supported. This guide ring, which is of course of annular formation, having throughout its circumference the same cross section as illustrated, has a bore 15a of proper diameter to permit it to be slipped over the crown of the inner race member 11 and to float freely thereon for rotation with respect thereto. The outside of the ring 15 is provided with oppositely inclined frusto-conical surfaces 15b, 15b, the inclination of which corresponds to that of the projecting end portions 14b of the retainers 14. The size of the ring 15 is such that these end portions of the retainers float freely thereon.

With this construction the retainers 14 are positively supported at all times in axial alignment with the race members of the bearing, and proper operation of the bearing is assured regardless of the amount of wear to which the retainers may be subjected. By reason of the free running fit between the ring 15 and the race member 11 and also between the ring 15 and the retainers 14, the ring floats freely in the bearing and will normally rotate in the same direction as the retainers and at a speed which may be intermediate between that of the retainers and that of the inner race member. It is also free floating with respect to self-aligning movements of the bearing parts and will always maintain its proper relative position with respect to the bearing rollers and retainers.

The guide ring 15 shown in Fig. 1 is also provided with portions for guiding the rollers 13 and exerting a squaring action thereon when required. Such means are constituted by laterally extending portions of the ring having frusto-conical side surfaces 15c, 15c, of substantially the same inclination as the flat inwardly facing ends of the bearing rollers 13, 13. Due to the fact that the rollers are inclined outwardly away from the bearing axis toward the transverse median plane of the bearing, the rollers tend to move in that direction under the influence of centrifugal force when the bearing is in operation, and in so far as internal clearance permits are displaced in that direction when not under load. This causes the rollers to run out of their proper paths and then to be forced back into the proper paths during each revolution of the bearing, which is of course objectionable. The guide ring 15, by engaging the inner ends of the rollers 13, 13, as shown, prevents such axial displacement of the rollers by centrifugal force and thus serves another very useful function.

Still further, the form of guide ring shown in Fig. 1 has the advantage of exerting a squaring action on the rollers, preventing them from skewing out of their normal running positions. This is accomplished by reason of the fact that the flat inner ends of the rollers engage the side surfaces 15c, 15c, of the ring 15 at a plurality of points which are circumferentially spaced on said surfaces and are transversely spaced across the roller ends. The squaring action is particularly pronounced in this construction by reason of the fact that the zones of contact between the guide ring and the roller ends are near the median transverse axes of such ends, rather than being close to the axes thereof which intersect the axis of rotation of the bearing. Thus it will be seen that this guide ring serves a triple function in guiding the retainers and guiding and squaring the rollers.

Figure 2:
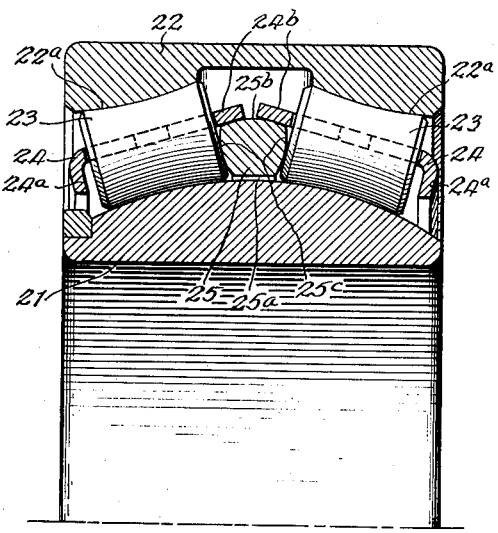
Fig. 2 is a similar view showing another embodiment of the invention, involving certain modifications in the various parts of the construction.

The construction shown in Fig. 2 comprises somewhat different forms of race members, rollers and retainers, but the general relationships and functions of the parts are the same as in Fig. 1. The inner race member, having a spherically curved bearing surface, is designated by the reference character 21, and a one-piece outer race member 22 having two bearing surfaces 22a, 22a, of curvature complementary to that of the inner race member, is provided. Two rows of concave surfaced rollers 23, 23, coact between the inner race member and the respective bearing surfaces of the outer race member, these rollers also having flat ends. Retainers 24, 24, of suitable construction for use with this type of roller are disposed similarly to the retainers 14 of Fig. 1 and are similarly provided with strengthening flange portions 24a, 24a, and inwardly facing projecting end portions 24b, 24b.

A modified form of guide ring 25 is provided, with a bore 25a having a free running fit with the bearing surface of the inner race member 21. Both the outside surface 25b and the side surfaces 25c, 25c, of the guide ring 25 are convexly curved in cross section, whereby tangential contact between the guide ring and both the retainers and the roller ends is obtained. This construction is of advantage in reducing friction and also in carrying lubricant between the relatively moving parts, which is accomplished by a capillary or wedging action between the contacting parts adjacent the points of tangency thereof.

The guide ring construction shown in Fig. 2 serves similarly to that of Fig. 1 in supporting and guiding the retainers and in guiding the rollers against displacement by centrifugal action. It also serves effectively to exert a squaring action on the rollers, although this action is somewhat less pronounced than with the construction shown in Fig. 1, because there is less contact between the roller ends and the sides of the guide ring.

Figure 3:
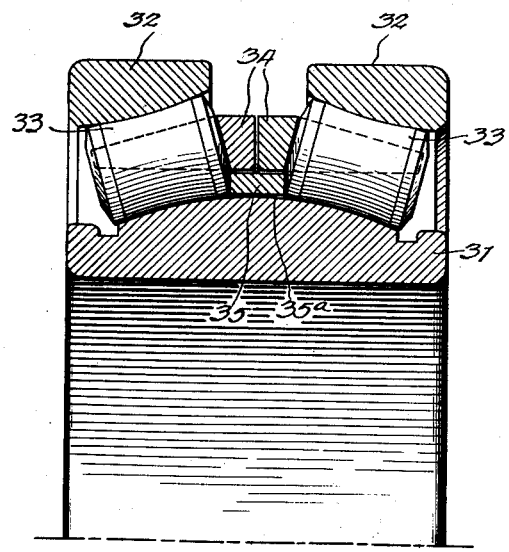
Fig. 3 is a similar view showing a bearing of the same general type as that of Fig. 1 but utilizing different forms of rollers, retainers and guide ring.

Fig. 3 shows a bearing having an inner race member 31 and outer race members 32, 32, similar to the corresponding parts of the bearing shown in Fig. 1. Two rows of rollers 33, 33, coact between the inner race member and the respective outer race members, and retainers 34, 34, are provided for the respective rows of rollers. These retainers are of the cast type, such as the well-known cast bronze retainers. A guide ring 35 of rectangular cross section is interposed between the two rows of rollers and has a bore 35a providing a free running fit with the bearing surface of the inner race member. A free running fit is also provided between the outside of the guide ring 35 and the bore of the inwardly facing ends of the retainers 34, 34, so that the ring 35 floats between the inner race member and the retainers as previously described.

The rollers are provided with frusto-conical surfaces at the marginal portions of the ends thereof, the angle of inclination of these surfaces being complementary to the angle of inclination of the roller axes in the assembled bearing. The element of each of these surfaces which is nearest to the axis of the bearing therefore lies in a line at right angles to such axis and has radial line contact with the adjacent side face of the guide ring 35. This contact furnishes the desired guiding effect to prevent displacement of the rollers by centrifugal action, but no squaring action is exerted upon the rollers. This type of construction, therefore, is suitable where no squaring action is desired.

Figure 4:
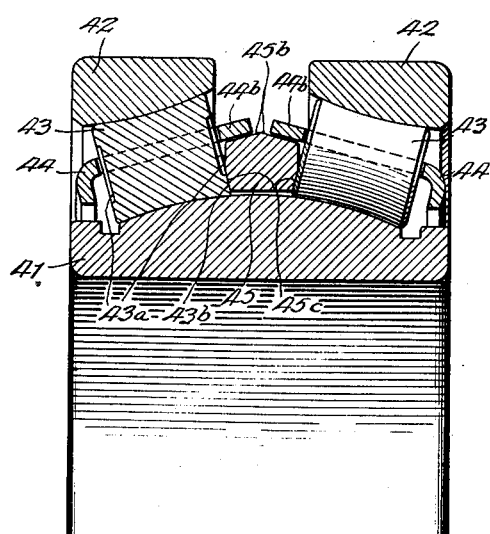
Fig. 4 is a similar view of another bearing of the same general type as that of Fig. 1 but utilizing different forms of rollers and guide ring.

Fig. 4 shows still another modification of the invention, embodied in a bearing comprising an inner race member 41 and outer race members 42, 42, similar to the corresponding parts of the bearing shown in Fig. 1. Two rows of rollers 43, 43, are similarly disposed in the bearing, these rollers being generally similar to those illustrated in Fig. 2 but having so-called "dimpled" ends 43a. Suitable retainers 44, 44, are provided with inwardly facing projecting end portions 44b, 44b, each having a free running fit with a similarly inclined frusto-conical surface 45b of a guide ring 45 which floats on the bearing surface of the inner race member in the same manner as herein described with reference to the other embodiments of the invention. The marginal portions 43b of the roller end surfaces, bordering the dimples 43a therein, are flat and engage frusto-conical surfaces 45c, 45c, on the sides of the guide ring 45. The inclination of these guide ring surfaces corresponds to that of the roller ends in the assembled bearing, as shown. This construction provides the same support and guiding action for the retainers and the same maintenance of the rollers against displacement by centrifugal action as do the constructions illustrated in the previous figures of the drawing, and also exerts some squaring action on the rollers, although not as much as in the constructions of Figs. 1 and 2, because the contact between the guide ring and the ends of the rollers is not as close to the median transverse axes of the latter.

It will be seen from the foregoing that the present invention may be embodied in various types of antifriction bearings with the result that the operation thereof is improved in many important respects.

While only certain specific embodiments of the invention have been illustrated and described herein, it will be readily understood by those skilled in the art that various other modifications and changes may be made therein without departing from the spirit and scope of the invention as set forth in the appended claims.

What is claimed as new and is desired to secure by Letters Patent, therefore, is:

1. An antifriction bearing comprising inner and outer race members, one of which has a substantially spherically curved bearing surface, two rows of oppositely inclined bearing rollers coacting therebetween, a guide ring rotatably supported by said one of said race members in freely movable relation thereto and interposed between said rows of rollers to guide the same, and separate retaining members for said two rows of rollers, said retaining members being provided with individual roller openings of less width than the diameter of the rollers at corresponding locations, whereby said retaining members are supported solely by the respective rows of rollers and entirely independently of each other during the initial stages of service of the bearing and as long as the roller openings retain substantially their original dimensions, and said retaining members respectively comprising portions overlying said guide ring and having clearance with respect thereto.

2. A self-aligning antifriction bearing comprising an inner race member having a substantially spherically curved bearing surface, outer race means having a pair of convex bearing surfaces of curvature complementary to that of the inner race member, two rows of oppositely inclined, concave-surfaced bearing rollers coacting between said inner race member and the respective bearing surfaces of said outer race means, a retaining member for each of said rows of rollers each of said rollers having the minimum diameter of its concave-surfaced portion intermediate the ends thereof whereby thrust loads on the bearing are carried by the rollers in direct coaction with said inner race member and said outer race means, and a guide ring fitting freely over said inner race member and rotatably and oscillatably supported thereby and interposed between said rows of rollers in direct contact with the ends thereof to guide the same without being subjected to appreciable thrust loads.

3. A self-aligning antifriction bearing comprising an inner race member having a substantially spherically curved bearing surface, outer race means having a pair of convex bearing surfaces of curvature complementary to that of the inner race member, two rows of oppositely inclined, concave-surfaced bearing rollers coacting between said inner race member and the respective bearing surfaces of said outer race means, each of said rollers having the minimum diameter of its concave-surfaced portion intermediate the ends thereof whereby thrust loads on the bearing are carried by the rollers in direct coaction with said inner race member and said outer race means, a guide ring fitting freely over said inner race member and rotatably and self-aligningly supported thereby and interposed between said rows of rollers to guide the same without being subjected to appreciable thrust loads, and separate retaining members for said two rows of rollers, said retaining members being provided with individual roller openings of less width than the diameter of the rollers at corresponding locations, whereby said retaining members are initially carried by the rollers, and said retaining members comprising portions overlying said guide ring and having clearance with respect thereto.

4. An antifriction bearing comprising an inner race member having a substantially spherically curved bearing surface, outer race means, two rows of oppositely inclined bearing rollers coacting between said inner race member and said outer race means, a guide ring rotatably supported by said inner race member in freely movable relation thereto and interposed between said rows of rollers to guide the same, and separate retaining members for said two rows of rollers, said retaining members being provided with individual roller openings of less width than the diameter of the rollers at corresponding locations, whereby said retaining members are supported solely by the respective rows of rollers and entirely independently of each other during the initial stages of service of the bearing and as long as the roller openings retain substantially their original dimensions, and said retaining members respectively comprising portions overlying said guide ring and having clearance with respect thereto.

5. An antifriction bearing comprising an inner race member having a substantially spherically curved bearing surface, outer race means having a pair of convex bearing surfaces of curvature complementary to that of the inner race member, two rows of oppositely inclined, concave-surfaced bearing rollers coacting between said inner race member and the respective bearing surfaces of said outer race means, a guide ring rotatably supported by said inner race member in freely movable relation thereto and interposed between said rows of rollers to guide the same, and separate retaining members for said two rows of rollers, said retaining members being provided with individual roller openings of less width than the diameter of the rollers at corresponding locations, whereby said retaining members are supported solely by the respective rows of rollers and entirely independently of each other during the initial stages of service of the bearing and as long as the roller openings retain substantially their original dimensions, and said retaining members respectively comprising portions overlying said guide ring and having clearance with respect thereto.

ARTHUR H. WILLIAMS.